United States Patent [19]

Frascaroli et al.

[11] Patent Number: 4,570,408
[45] Date of Patent: Feb. 18, 1986

[54] BEAM ASSEMBLY

[75] Inventors: Francesco Frascaroli, Bologna; Carlo Biondi, S.Giovanni in Persiceto, both of Italy

[73] Assignee: C.O.M. Cooperativa Operai Metallurgici s.c.r.l., Bologna, Italy

[21] Appl. No.: 612,331

[22] Filed: May 21, 1984

[30] Foreign Application Priority Data

Jun. 10, 1983 [IT] Italy .................................. 5006/83[U]

[51] Int. Cl.[4] ................................................ E04C 3/32
[52] U.S. Cl. ..................................... 52/726; 403/176; 403/297
[58] Field of Search .................. 52/726, 584; 403/297, 403/176; 182/178

[56] References Cited

U.S. PATENT DOCUMENTS 2,962,133 11/1960 Kivett et al. ........................... 52/584
4,291,999 9/1981 Vandelanoite ....................... 403/172

FOREIGN PATENT DOCUMENTS 1373571 11/1974 France ................................. 403/297
2308333 11/1976 France ................................. 403/176
417010 1/1967 Switzerland ........................... 52/726
828286 2/1960 United Kingdom ................ 182/178

Primary Examiner—James L. Ridgill, Jr.
Attorney, Agent, or Firm—Fuller, House & Hohenfeldt

[57] ABSTRACT

A beam assembly (1), in which two hollow beams (2,3) are head connected to each other by means of a connecting member (9) formed by two concave plates (11,12) arranged with their concavities facing in opposite directions and each extending part inside one and part inside the other of the above two beams (2,3); the two plates (11,12) cooperate with a force element (25) which moves them apart and against opposite walls (2) of each of the above two beams (2,3).

3 Claims, 3 Drawing Figures

BEAM ASSEMBLY

The present invention relates to a beam assembly, in which two beams, in particular two hollow beams, are connected to each other in a head-to-head relationship.

In general, the head connection of two hollow beams is carried out by using an intermediate member, which is force fitted inside the facing end of the two beams. The above intermediate member is then normally fixed relative to the two beams by means of transverse pins.

The beam assembly described above, apart from being expensive, since it requires that all its components have very precise sizes, suffers from the drawback that it is not fatigue resisting.

It is an object of the present invention to provide a beam assembly which avoids the above drawbacks.

According to the present invention there is provided a beam assembly comprising at least a first and a second hollow beam arranged in a head-to-head relationship, and disengageable connecting means engaging both said beams to connect the same to one another, said connecting means comprising two members arranged close to each other and each extending partly inside said first hollow beam and partly inside said second hollow beam, and forcing means to move said two members apart and force each of them into contact with an internal surface of both said beams.

The invention will be described by way of example with reference to the accompanying drawings, in which.

Figure 1:
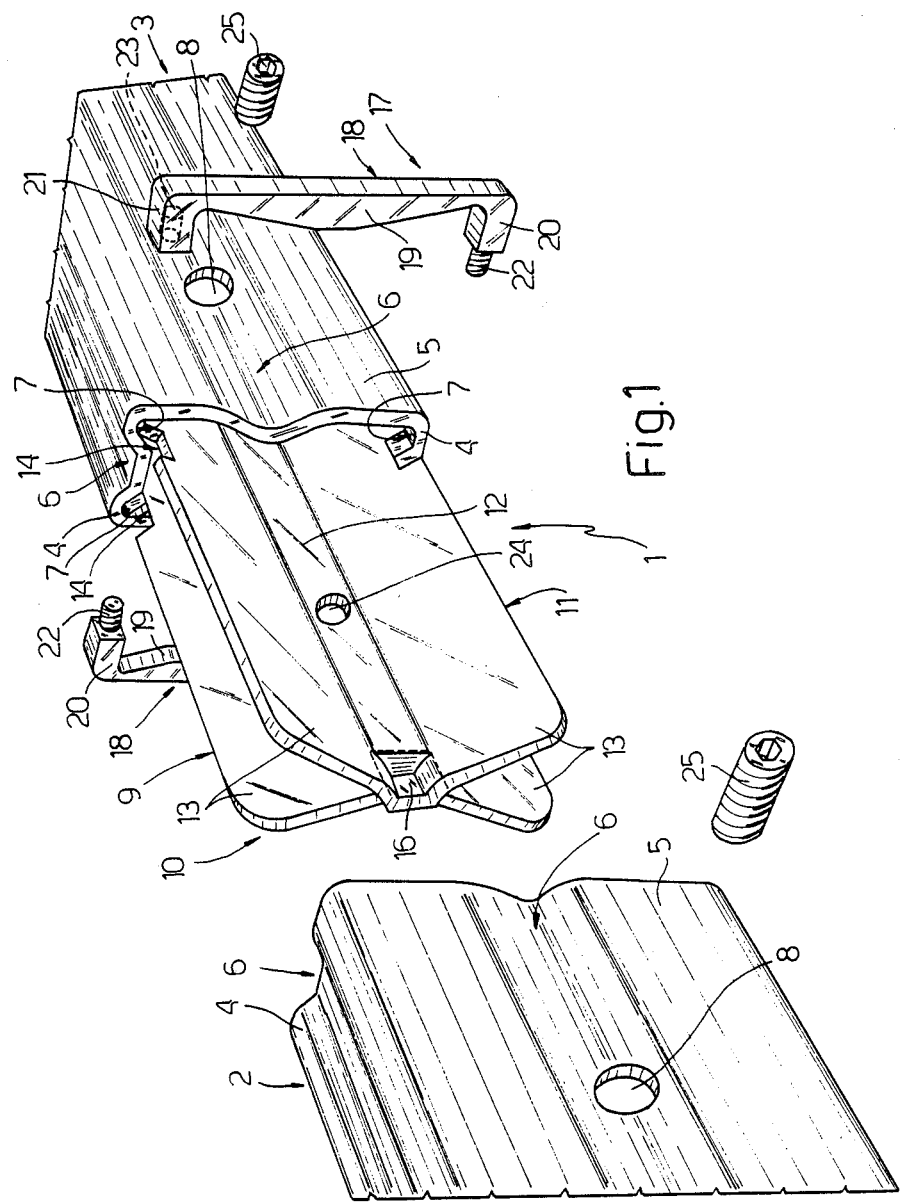
FIG. 1 shows an exploded perspective view of a beam assembly.
Figure 3:
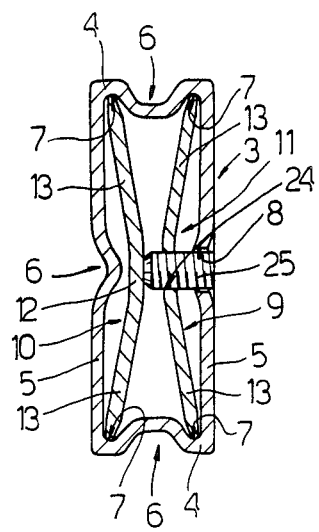
FIG. 3 is a sectional view of the assembly of FIG. 1.

In the Figures, a beam assembly 1 is shown comprising two hollow, coaxial, identical beams 2 and 3 preferably made of metal.

Each beam 2,3 has a substantially rectangular cross-section and comprises parallel top and bottom walls 4 and side walls 5, each of which is centrally bent inwards to define a respective longitudinal central groove 6. As each wall 2 is of constant thickness, two parallel grooves 7 are defined on the inner side thereof on opposite sides of a rib corresponding to groove 6.

Each of beams 2 and 3 is provided, close to its end connected to the other beam, with a hole 8 extending through one of walls 3 at the central groove 6 thereof.

Figure 2:
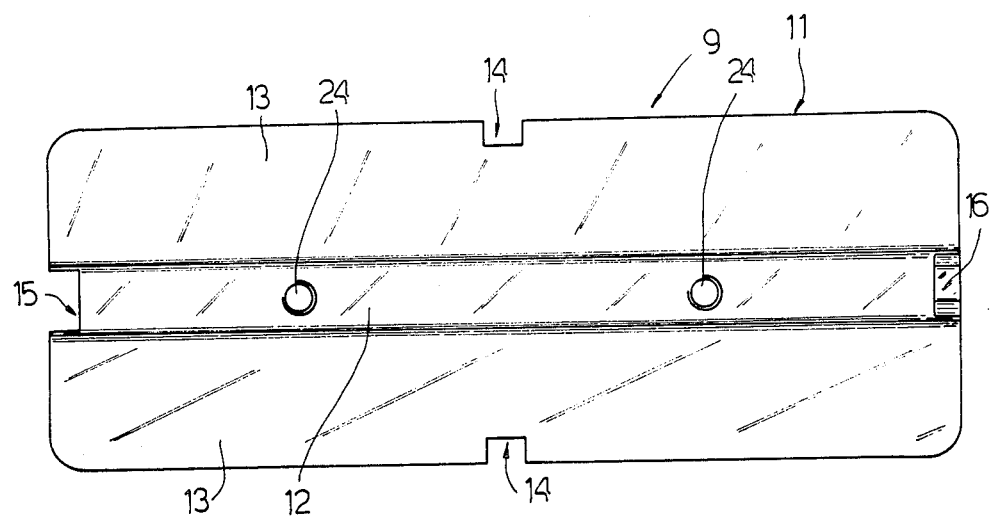
FIG. 2 is a lateral view of a particular of FIG. 1.

In FIGS. 1 and 2 a connecting member 9 is shown joining together beams 2 and 3, said member 9 comprising two similar metal plates 10 and 11 each having a centre portion 12 and two side portions 13 each lying in a plane converging with that of centre portion 12. In the arrangement hereinafter described, plates 10 and 11 are essentially concave. When in use, plates 10 and 11 are housed inside beams 2 and 3 with their concavities facing in opposite directions.

As shown in FIG. 2, plates 10 and 11 have an essentially rectangular contour and the free edge of each of their side portions 13 is provided with a central cut-out 14. The two end edges of each centre portion 12 are provided the first with a cut-out 15 and the second with a ridge 16; cut-out 15 of plate 10 being engaged by ridge 16 of plate 11, the cut-out 15 of which is engaged by ridge 16 of plate 10.

Connecting member 9 also comprises an annular element 17 consisting of two identical, essentially U-shaped pieces 18, each having a centre portion 19 and two side arms 20 and 21. Arm 20 is provided with a projecting tab 22 and arm 21 with a dead hole 23, both coaxial with their respective arms. Annular element 17 is formed by joining pieces 18 together by connecting each arm 20 to a respective arm 21. Connection is obtained by fitting each tab 22 into a respective hole 23. Annular element 17 is made preferably of plastic and engages cut-outs 14 to clamp plates 10 and 11 together and to define a spacer for beams 2 and 3.

The only difference between plates 10 and 11 is that, along the centre portion 12 of plate 11, provision is made for two threaded through holes 24 halfway between the centre area of portion 12 and its end edges. When being assembled, plate 11 is turned towards the inner face of that of walls 5 which is provided with hole 8.

Assembly of the two beams 2 and 3 is extremely straightforward.

After assembling connecting member 9 as already described, part of the latter is fitted inside beam 2 and the opposite part inside beam 3 so that the free longitudinal edge of each side portion 13 engages a respective groove 7.

Beams 2 and 3 are then brought together so that the only free space left between their ends is that occupied by annular element 17. In this position, holes 24 are arranged coaxial with respective holes 8.

A threaded pin 25 is than mounted through each hole 8 to engage corresponding threaded hole 24. When each said pin 25 is screwed in, the inner end thereof presses against centre portion 12 of plate 10 which are elastically deformed and gradually flattens out, i.e. becomes less concave, as its longitudinal free edges press harder and harder against walls 4. The same thing happens with plate 11. In other words, centre portions 12 on plates 10 and 11 are moved further apart by pin 25 and the greater the distance is between portions 12, the greater will be the thrust exerted by the free edges of portions 13 on walls 4, the stronger will be the connection between beams 2 and 3.

Of course, in place of pin 25, other means may be used for spacing centre portions 12 of plates 10 and 11 apart, such as a wedge (not shown) inserted inside each beam 2,3 through a hole (not shown) provided through walls 4.

We claim:

1. A beam assembly (1) comprising at least a first and a second hollow beam (2,3) arranged in a head-to-head relationship, and disengageable connecting means (9) engaging both said beams (2,3) to connect the same to one another, said connecting means (9) comprising:
    (a) two members (10,11) arranged close to each other and each extending partly inside said first hollow beam (2) and partly inside said second hollow beam (3), each member consisting of a substantially rectangular member comprising a center portion and two non-parallel side portions lying in planes converging with a plane of the central portion, the members being in contiguous contact along their respective center portions to form a generally X-shaped cross-section when in a relaxed state and being adapted to be inserted with loose sliding fits into the interiors of the beams, the first member having at least two tapped holes therethrough located in the center portion and near opposite ends of the plate; and
    (b) screw means for threading into the tapped holes in the first member and for bearing against the center portion of the second member to force the plates apart at the center portions and thereby force the side portions into tight contact with an internal surface of both said beams (2,3).

2. An assembly as claimed in claim 1, wherein said two members (10,11) are concave plates having free longitudinal edges and arranged with their concavities facing in opposite directions, the plate being elastically deformable to flatten when the screw means is actuated, and wherein seat means (7) are provided on the internal surface of said hollow beams (2,3) for being force-engaged by opposite free longitudinal edges of said concave plates (10,11) when the screw means is actuated.

3. An assembly as claimed in claim 2, wherein each said beam (2,3) has a substantially rectangular cross-section defined by two pairs of parallel walls (4,5); the interiors of the walls of a first of said pairs (4) being arranged in contact with the free longitudinal edges of said two plates (10,11); said seat means being engaged by said free longitudinal edges and consisting, for each said longitudinal edge, in a respective longitudinal groove (7) provided on a respective interior wall of said first pair of walls (4).

* * * * *